United States Patent

Hazenbroek

[11] Patent Number: 5,336,127
[45] Date of Patent: Aug. 9, 1994

[54] METHOD AND APPARATUS FOR CENTRALLY ALIGNING AND CUTTING THE KEEL BONE OF A POULTRY CARCASS

[76] Inventor: Jacobus E. Hazenbroek, Burg de Zeeuwstraat 52, Numansdorp, Netherlands

[21] Appl. No.: 949,429

[22] Filed: Sep. 22, 1992

[51] Int. Cl.⁵ .............................................. A22C 21/00
[52] U.S. Cl. ................................... 452/160; 452/163; 452/165; 452/170
[58] Field of Search ............... 452/163, 160, 149, 152, 452/153, 155, 165, 170, 167

[56] References Cited

U.S. PATENT DOCUMENTS

| | | | |
|---|---|---|---|
| 4,270,243 | 6/1981 | Lewis | 17/11 |
| 4,373,232 | 2/1983 | Harding et al. | 452/160 |
| 4,439,891 | 4/1984 | van Mil | 17/11 |
| 4,468,838 | 9/1984 | Sjöström et al. | 452/160 |
| 4,558,489 | 12/1985 | van Mil | 17/52 |
| 4,815,168 | 3/1989 | van den Nieuwelaar et al. | 17/52 |
| 4,964,194 | 10/1990 | Kessler et al. | 452/167 |
| 4,970,756 | 11/1990 | Durand | 452/160 |
| 5,015,213 | 5/1991 | Hazenbroek | 452/149 |
| 5,019,013 | 5/1991 | Hazenbroek | 452/151 |
| 5,035,673 | 7/1991 | Hazenbroek | 452/149 |
| 5,147,240 | 9/1992 | Hazenbroek et al. | 452/165 |
| 5,194,035 | 3/1993 | Dillard | 452/160 |

FOREIGN PATENT DOCUMENTS 2129278A 9/1982 United Kingdom .

*Primary Examiner*—Willis Little
*Attorney, Agent, or Firm*—Hopkins & Thomas

[57] ABSTRACT

A keel bone aligning apparatus (70) aligns the keel bone (78) of a carcass (10) with a rotary halving blade (61) so that the keel bone (78) is centrally cut with precision as the carcass (10) is carried along a processing path (12) and suspended by its legs (13) via a conveyor (11). As the carcass approaches the keel bone aligning apparatus (70), the visceral cavity (22) is introduced onto an internal guide rail (33). The keel bone aligning apparatus (70) has an angled guide plate (75) and a rollers (76a, 76b). The angled guide plate (75) initially engages and guides a portion of the carcass in the area of the keel bone. The rollers (76a, 76b) subsequently engage and guide the carcass portion during the cutting of the keel bone (78) by the rotary, halving blade (61).

21 Claims, 3 Drawing Sheets

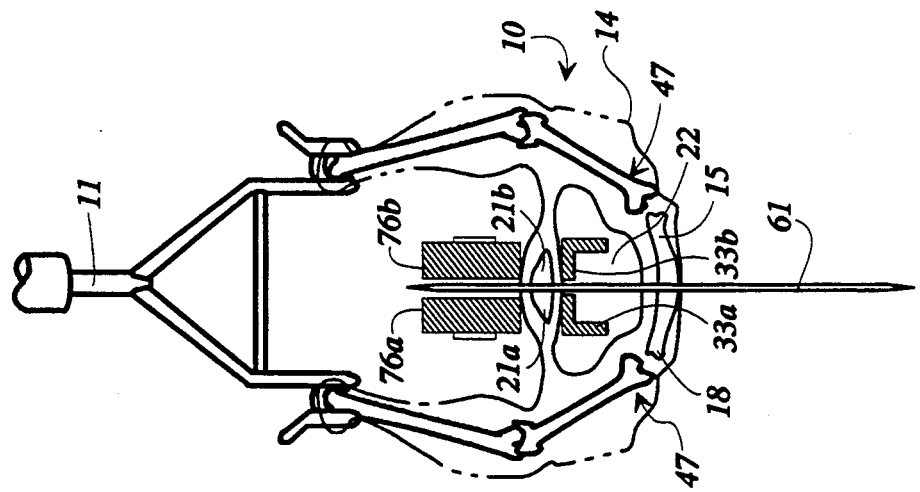
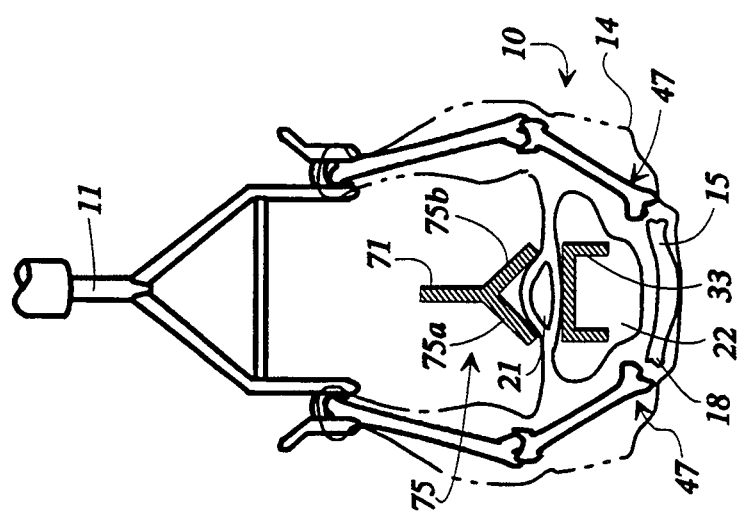

METHOD AND APPARATUS FOR CENTRALLY ALIGNING AND CUTTING THE KEEL BONE OF A POULTRY CARCASS

FIELD OF THE INVENTION

The present invention generally relates to processing poultry carcasses and, more particularly, to a method and apparatus for centrally aligning and cutting the keel bone of a poultry carcass in a carcass halving machine.

BACKGROUND OF THE INVENTION

During the processing of chickens, turkeys, and other poultry in a poultry processing plant which defeathers, eviscerates, cuts up, and packages the poultry for delivery and sale, it is highly desirable to perform as many of the processing steps as possible using automated machinery and processes. The use of automated machinery minimizes the more expensive manual handling of poultry carcasses as well as provides for more uniform cutting of the poultry carcasses.

In recent years during automated processing, poultry carcasses have been suspended by their legs from a suspended "overhead" conveyor system, and many of the processing steps have been automatically performed on the poultry carcasses as they are moved in series along the overhead conveyor system. For example, now in the industry, poultry carcasses can be defeathered, decapitated, opened, and eviscerated while being advanced progressively through a poultry processing plant on the overhead conveyor system. It is further desired that the poultry carcasses be segmented, or cut up, via automated processes while continuing their travel on the overhead conveyor system, so as to avoid the manual handling of the poultry carcasses when performing the hazardous and time-consuming cutting functions. Examples of such automated on-line cut-up operations are shown and described in U.S. Pat. No. 5,147,240 to Hazenbroek et al., U.S. Pat. No. 5,015,213 to Hazenbroek et al., and U.S. Pat. No. 5,035,673 to Hazenbroek et al., all of the disclosures of which are incorporated herein by reference. However, despite the achievements set forth in the foregoing patents, it is still a common practice in the industry to remove the poultry carcasses from the overhead conveyor system in order to perform cut-up operations on the poultry carcasses.

A significant problem with cutting apart poultry carcasses as the poultry carcasses are carried by the overhead conveyor system has been that it is difficult to make clean and accurate cuts through the center of the keel bone. In a poultry carcass, the keel bone resides in the front in opposing relationship to the vertebrae. The keel bone is analogous to the sternum in humans. Ribs connect between the vertebrae in the rear and the keel bone in the front. Further, from compositional vantage point, the keel bone is essentially a combination of bone tissue near the top and cartilage tissue near the bottom, making the keel bone somewhat flexible and movable, and therefore difficult to cut in the center.

Oftentimes, when the keel bone is cut, the keel bone is cut off center so that two disproportionate breasts result from the cutting process. Needless to say, vendors of breast products do not want to sell nonuniform breast products to consumers. In addition to the nonuniformity problem, one or both of the resulting breasts may have muscle tissue unattached to a rigid cut edge. Essentially, the dangling muscle tissue comprises a major pectoral muscle and a minor pectoral muscle separated via a cavity. Moreover, during marination of the breast having the dangling muscle tissue, the major and minor pectoral muscles undesirably separate, thereby making the marination process awkward and making the marinated breast aesthetically unpleasing. Furthermore, marination spices, such as hot spices, often get lodged and accumulate within the cavity separating the major and minor pectoral muscles. This accumulation can drastically distort the taste of the marinated breast and can potentially cause injury.

SUMMARY OF THE INVENTION

Briefly described, the present invention is a method and apparatus for centrally aligning and cutting the keel bone of a poultry carcass with accuracy as the poultry carcass is moved via an overhead conveyor along a processing path. The keel bone of the carcass is first oriented and supported approximately parallel to the processing path. For this purpose, an elongated internal guide rail substantially aligned with the processing path receives and supports the visceral cavity of the carcass. A cutting means, for example, a rotary halving blade, is situated substantially in line with the internal guide rail. As the carcass is moved toward the cutting means, the keel bone is guided so that the center of the keel bone is in substantial alignment with the cutting means.

To achieve this requisite alignment, a pivotal guide arm is preferably disposed with a lever end and a distal end. The distal end is urged toward the carcass and internal guide rail. Further, the guide arm has at least two faces situated near the distal end, which are configured to engage and guide the carcass so that the center of the keel bone is in approximate alignment with the cutting means. In the preferred embodiment, two faces are formed from an angled guide plate. Finally, rollers are situated at the distal end of the guide arm, just below the angled guide plate. The rollers are urged toward the carcass and internal guide rail, and are configured to engage and guide the keel bone as the keel bone is cut by the cutting means.

Thus, it is an object of the present invention to overcome the deficiencies and inadequacies of the prior art as described above in the background section.

Another object of the present invention is to provide a method and apparatus for centrally aligning and cutting the keel bone of a poultry carcass.

Another object of the present invention is to provide a method and apparatus for accurately guiding the internal keel bone of a carcass by exterior contact with the carcass.

Another object of the present invention is to provide a method and apparatus for gripping and holding the keel bone of a carcass during the cutting process.

Another object of the present invention is to provide a method and apparatus for cutting the keel bone of a carcass so that two uniform breasts are generated.

Another object of the present invention is to provide a method and apparatus for cutting the keel bone of a carcass so that all muscle tissue of the resulting breasts is attached to a rigid cut edge generated by the cutting process.

Another object of the present invention is to provide a method and apparatus for cutting the keel bone of a carcass so that the resulting breasts do not have an exposed cavity within the muscle tissue.

Another object of the present invention is to provide an apparatus for centrally aligning and cutting the keel bone of a carcass which is simple in design, inexpensive to manufacture, and reliable and accurate in operation.

Other objects, features, and advantages of the present invention will become apparent from the following detailed description when taken into conjunction with the accompanying drawings in which like characters of reference designate corresponding parts throughout the several views.

BRIEF DESCRIPTION OF THE DRAWINGS

The present invention, as defined in the claims, can be better understood with reference to the following drawings. The drawings are not necessarily to scale, emphasis instead being placed upon clearly illustrating principles of the present invention.

FIG. 3 is an end cross-sectional view taken along line 3'—3' of FIG. 2 showing a carcass mounted on an internal guide rail as the carcass engages an angled guide plate of the keel bone aligning apparatus.

FIG. 4 is an end cross-sectional view taken along line 4'—4' of FIG. 2 showing the carcass as it engages the rollers of the keel bone aligning apparatus.

DETAILED DESCRIPTION OF THE PREFERRED EMBODIMENT

Figure 1:
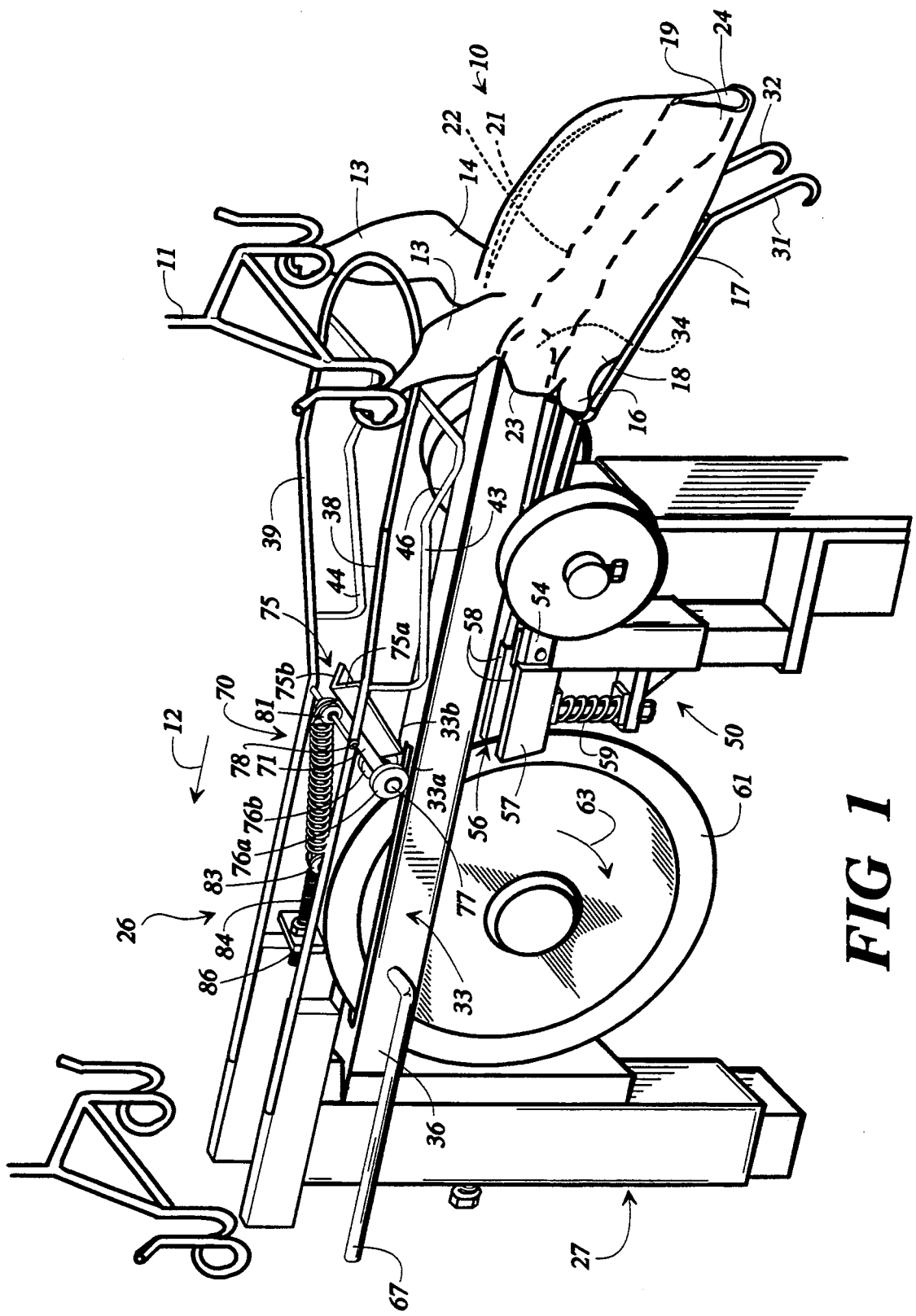
FIG. 1 is a perspective view of a carcass halving machine having the keel bone aligning apparatus in accordance with the present invention.
Figure 2:
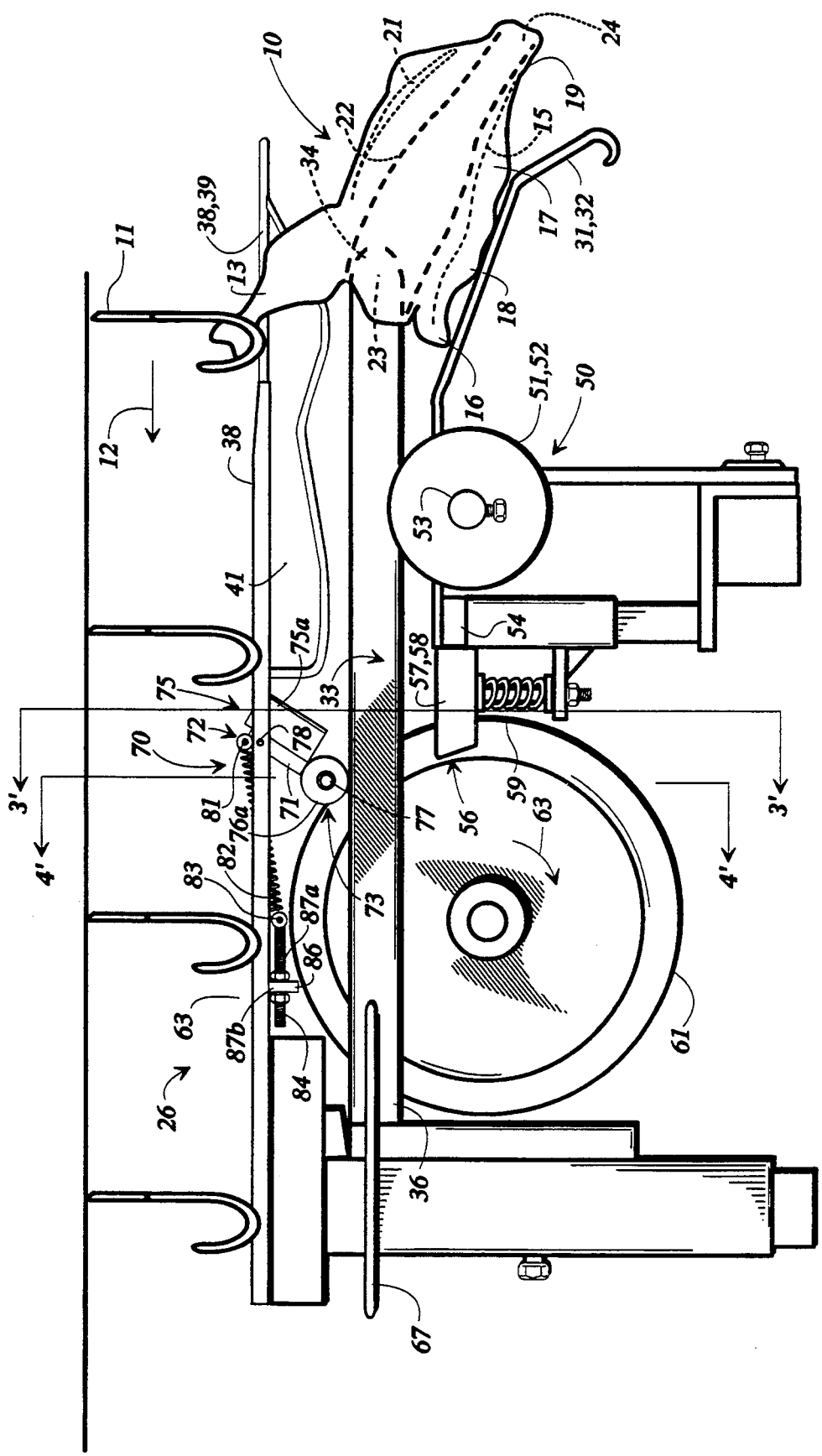
FIG. 2 is a side elevational view of the carcass halving machine and keel bone aligning apparatus of FIG. 1.

Referring now to the drawings in which like numerals represent corresponding parts throughout the several views, FIGS. 1 and 2 illustrate a poultry carcass 10 suspended from a shackle 11 of a conventional overhead conveyor system having movable shackles 11. The carcass 10 is moved along a processing path, as shown by an arrow 12. The poultry carcass 10 includes legs 13, thighs 14, tail 16, upper back 17, lower back 18, the vertebrae 15 of the back, neck 19, and a keel bone 21, which is the focus herein. A visceral cavity 22, shown in phantom lines, extends through the poultry carcass 10, from a visceral opening 23 at the trail of the poultry carcass 10 to a neck opening 24 left by the prior removal of the crop and windpipe (not shown).

As illustrated in FIG. 1, the poultry carcass 10 is carried by the shackles 11 of the overhead conveyor system in the direction of the arrow 12 with the poultry carcass 10 inverted by its legs 13. Its tail 16 faces upwardly, its neck 19 faces downwardly, and its back faces in the direction of movement indicated by the arrow 12. The wings (not shown) of the poultry carcass 10 typically have been removed from the poultry carcass 10 prior to entering the carcass halving machine 26.

As illustrated in FIGS. 1 and 2, the carcass halving machine 26 includes an adjustable frame 27 and is mounted in the path of movement 12 of the poultry carcass 10 on the overhead conveyor system. The carcass halving machine 26 is mounted to a larger cut-up system apparatus, not shown, such that the carcass halving machine 26 functions in series with other poultry processing devices as part of a poultry processing line. At the foremost end of the carcass halving machine 26 are a pair of parallel lower guide rods 31, 32. The lower guide rods 31, 32 initially are sloped upwardly and as the lower guide rods extend into the apparatus, they gradually become oriented horizontally, becoming aligned with the path of movement 12 of the poultry carcass 10 along the overhead conveyor system. The guide rods 31, 32 become closely spaced apart along the path 12 and the external protrusions of the vertebrae 15 which extend exteriorly of the carcass 10 are received between and are guided by the lower guide rods 31, 32.

As the side view in FIG. 2 illustrates, the lower guide rods 31, 32 are the first elements to engage the suspended carcass 10 and tilt the carcass 10 from a generally vertical attitude toward a rearwardly inclined attitude to align the visceral opening 23 of the poultry carcass 10 with an elongated internal guide rail 33. As shown in FIGS. 1 and 2, the internal guide rail 33 extends horizontally along the processing path 12 of the poultry carcass 10 and includes a tapered nose portion 34, onto which the visceral opening 23 is received, a discharge end 36, and a downwardly-facing slot 37 formed along its length between the nose portion 34 and the discharge end 36. The internal guide rail 33 receives and supports the visceral cavity 22 of the poultry carcass 10 as the poultry carcass 10 proceeds along its processing path 12, with the internal protrusions of the vertebrae 15 extending into the visceral cavity 22 of the carcass 10 riding in the slot 37.

A pair of joint opening guide rods 43, 44 are mounted to the upper guide rods 38, 39, projecting outwardly and downwardly from the respective upper guide rods 38, 39. As further illustrated in FIGS. 1 and 2, each joint opening guide rod 43, 44 includes a run 46 extending in substantially the direction of movement of the poultry carcass 10. Each run 46 initially extends horizontally, then slopes upwardly, and then downwardly, as shown. The joint opening guide rods 43, 44 are mounted in a position to engage the carcass 10 adjacent its connecting joints 47 between the legs and thighs of the poultry carcass 10 as the poultry carcass 10 proceeds along the processing path 12 so as to stabilize the joints and to spread the thighs of the carcass apart, tending to open the joints.

A joint separating means 50 is mounted below the joint opening guide rods 43, 44, in a position to engage the connecting thigh joints 47 between the thighs 14 and lower back 18 of the poultry carcass 10. The joint separating means 50 is described in detail in U.S. Pat. No. 5,147,240 to Hazenbroek et al., also the inventors herein. The foregoing patent is incorporated herein by reference as if set forth in full hereinbelow. The joint separating means 50 includes a pair of rotatable wheels 51, 52 mounted upon an axle 53 that extends through a support block 54 of the carcass halving machine 26. The wheels 51, 52 are mounted on opposite sides of the internal guide rail 33 and straddle respective lower guide rods 31, 32, in a position to engage the thighs of the poultry carcass 10 as the poultry carcass 10 is pulled along the length of the internal guide rail 33.

A spring-biased positioning member 56 is mounted to the downstream side of support member 54. The positioning member 56 includes a pair of metal plates 57 and 58 pivotally attached to support member 54. A compression spring 59 is mounted beneath plates 57 and urges the plates upwardly toward the internal guide rail 33. Consequently, as a poultry carcass 10 is pulled along the internal guide rail 33 and is engaged by the plates 57, 58 of the positioning member 56, the internal surfaces of the upper and lower back portions of the poultry carcass 10 are pressed against the internal guide rail 33 and are thus firmly positioned for cutting.

A large rotary halving blade 61 is mounted adjacent the positioning member 56, extending partially between the plates 57, 58 of the positioning member. The halving blade 61 is mounted upon an axle 62 and extends upwardly through the slot 37 formed in the internal guide rail 33. The halving blade 61 is rotated in the direction of arrows 63 by a drive motor (not shown) and engages the poultry carcass 10 as the poultry carcass 10 is pulled along the internal guide rail to separate the poultry carcass 10 along the backbone 15.

In accordance with the present invention, a keel bone aligning apparatus 70 is mounted above the positioning member 56 and just preceding the rotary halving blade 61. The keel bone aligning apparatus 70 has a pivotal guide arm 71 with a lever end 72 and a distal end 73, which are pivotal about an axis 78. The axis 78 can be, for example, merely a nut and bolt arrangement with perhaps a bushing.

The guide arm 71 preferably has two guiding/aligning mechanisms. One guiding/aligning mechanism is an angled guide plate 75 affixed to the guide arm 71 near the distal end 73 thereof. The angled guide plate 75 comprises two smooth planar faces 75a, 75b for engaging and guiding the carcass 10 so that the underlying keel bone 21 may be accurately guided and urged downwardly. It should be noted that the guide arm 71 can comprise any number of faces and other types of arm configurations for contacting the carcass 10. The guide arm 71 further comprises another guiding/aligning mechanism in the form of a pair of spaced rotatable rollers 76a, 76b situated at the distal end 73. The rollers 76a, 76b are rotatable about a roller axis 77, for example, a nut and bolt arrangement with perhaps a bushing and a spacer therebetween. Further, the rollers 76 are capable of moving upwardly and downwardly depending upon the contour of the carcass 10.

Furthermore, the lever end 72 of the guide arm 71 has a spring anchoring aperture 81 affixed thereto. A spring 82 applies force against the spring anchoring aperture 81 in a direction shown approximately by arrow 12. The force of spring 82 causes the guide arm 71 to pivot about the guide arm pivoting axis 78, thereby forcing the rollers 76a, 76b and the angled guide plate 73 downwardly toward and against the carcass 10 as the carcass 10 moves by the same. The spring 82 is affixed at its other end at a stationary spring anchoring aperture 83, which is in general attached to the halving machine 26. The stationary spring anchoring aperture 83 is adjustable via a threaded elongate member 84, such as a bolt or other suitable means, affixed to a mounting plate 86 via nuts 87a, 87b on respective sides of the mounting plate 86. The mounting plate 86 is preferably mounted to the guide rod 38.

As further illustrated in FIGS. 1 and 2, a pair of exit guide bars 67, 68 are attached to the internal guide rail 33 adjacent the discharge end 36 of the internal guide rail 33. The guide bars 67, 68 extend outwardly from the internal guide rail at a gradual angle, and then extend horizontally, as indicated, extending approximately parallel to the processing path 12.

OPERATION

As illustrated in FIG. 1, the poultry carcass 10 is carried by the shackles 11 along a path of movement 12 toward the carcass halving machine 26. As the poultry carcass 10 enters the carcass halving machine 26, the upper and lower back portions 17, 18 of the poultry carcass 10 engages the lower guide rods 31, 32, which causes the poultry carcass 10 to tilt rearwardly to align the visceral opening 23 of the poultry carcass 10 with the nose portion 34 of the internal guide rail 33. As the poultry carcass 10 is pulled forwardly along the processing path 12 by the shackles 11, the poultry carcass 10 is pulled onto the internal guide rail 33 with the internal guide rail 33 extending through the visceral cavity 22 of the poultry carcass 10.

As the poultry carcass 10 is pulled onto and along the internal guide rail 33, the upper and lower back portions 17, 18 thereof are straddled by and supported by and ride along the corresponding lower guide rods 31, 32. At the same time, the upper guide rods 38, 39 project between the legs 13 of the carcass 10 and the joint opening guide rods 43, 44 press the thighs 14 outwardly. The guide rail 33 receives the internally projecting portion of the vertebrae 15 in the longitudinal slot 37 and the lower guide rods 31, 32 straddle the outer projecting portion of the vertebrae 15 and press the back of the carcass 10 upwardly against the internal guide rail 33. As a result of the leg joints 47 being urged outwardly, the thigh joints 47 between the thighs 14 and the lower back 18 of the poultry carcass 10 tends to open and the tendons and other tissue (not shown) holding the connecting thigh joints 51 between the thigh bones and the backbones 15 are stretched and become taut.

As the poultry carcass 10 is pulled forwardly with its legs spread outwardly, its thigh joints 47 are abruptly engaged by the wheel members 51, 52 of the joint separating means 50. The wheel members 51, 52 engage the knuckle of each thigh bone at the thigh joints. As the knuckle of each thigh bone passes over the wheel members 51, 52, the knuckles are urged upwardly. With the internal guide rail 33 and the lower guide rods 31, 32 holding the back of the poultry carcass 10 fixed in place as it slides along the guide rail 33 and the shackles 11 and joint opening guide rods restricting further vertical and lateral movements of the legs and thighs, the wheel members 51, 52 force the dislocation of the thigh bone from the back of the carcass 10 upon the application of the sudden upward forces against the thigh joints. Thus, each thigh bone is dislocated from its mated engagement with the backbone of the poultry carcass 10.

Additionally, the dislocating of the knuckles of the thigh bones by the wheel members 51, 52 causes some of the tendons and other tissue holding the thigh joints 51 together, which have been stretched tight by the joint opening guide rods 43, 44, to separate or tear apart. Thus, the thigh joints 47 of the poultry carcass 10 is completely separated so that the thighs 14 of the poultry carcass 10 can be easily and cleanly separated from the lower back 18 of the poultry carcass 10 by later cutting operations without as much risk of hazardous bone fragments being created and becoming lodged in the meat of the poultry carcass 10.

Once the connecting thigh joints between the thighs 14 and lower back 18 of the poultry carcass 10 have been separated, the poultry carcass 10 is moved further along the internal guide rail 33 into engagement with the spring biased positioning member 56. The positioning member 56 urges the poultry carcass 10 upwardly, pressing the upper and lower back portions 17, 18 flat against the lower side of the internal guide rail 33 to align and center the poultry carcass 10 and hold the poultry carcass 10 fixed in the proper position for cutting, to thereby ensure that the poultry carcass 10 is cleanly and accurately separated by the rotary halving blade 61.

Next, the poultry carcass 10 is pulled into engagement with the keel bone aligning apparatus 70. Essentially, the keel bone aligning apparatus 70 aligns and guides the keel bone 21 of the carcass 10 so that the center of the keel bone 21 is in substantial alignment with the rotary halving blade 61 during the cutting process. More specifically, as illustrated in FIG. 3, the angled guide plate 75 having faces 75a, 75b exteriorly engages the carcass 10 in the area near the underlying keel bone 21. The angled guide plate 75 is urged downwardly against the carcass 10 via the urging tension from spring 82. The angled guide plate 75 ensures that the keel bone center is substantially aligned near the center of the spacing between the rollers 76a, 76b.

As the carcass 10 is pulled further in the direction of the arrow 12, the rollers 76a, 76b contact the exterior portion of the carcass 10 which was just previously guided and oriented by the angled guide plate 75, as illustrated in FIG. 4. The rollers 76a, 76b urge the keel bone 21 downwardly so that the keel bone 21 is fixedly suspended, or sandwiched, within the carcass 10 between the rollers 76a, 76b and the respective internal guide rail halves 33a, 33b, just before the cutting process. As further shown in FIG. 4, as the carcass 10 is pulled in contact with the rotary halving blade 61, the blade 61 cuts the keel bone 21 into two substantially equivalent keel bone pieces 21a, 21b, while the keel bone pieces 21a, 21b remain sandwiched.

Once the poultry carcass 10 has been cut in half by the rotary halving blade 61, the poultry carcass 10 is carried by its shackles 11 into engagement with the guide bars 67, 68 at the discharge end 36 of the internal guide rail 33. The guide bars 67, 68 urge the carcass halves apart, to ensure they are fully separated as the carcass halves proceed along the overhead conveyor system for further processing by subsequent processing stations.

It will be obvious to those skilled in the art that many variations and modifications may be made to the above-described embodiments, which were chosen for the purpose of illustrating the present invention, without substantially departing from the spirit and scope of the present invention. Accordingly, all such variations and modifications are intended to be included herein within the scope of the present invention, as set forth in the following claims.

I claim:

1. A method of longitudinally bisecting a poultry breast of a previously eviscerated poultry carcass along its keel bone, comprising the steps of:

moving said carcass suspended by its legs in an inverted attitude with an overhead conveyor along a processing path toward a cutting means with the back of the carcass leading the breast of the carcass;

as the carcass continues to move, tilting the carcass to orient and support the keel bone of said carcass facing upwardly and extending approximately parallel to the processing path;

engaging with a first guide means the exterior of the breast of the carcass in straddling relationship with respect to the keel bone and guiding with said first guide means the keel bone of said carcass into longitudinal alignment with said cutting means; and as said keel bone is guided toward said cutting means, moving the previously eviscerated visceral cavity of the carcass about a longitudinal guide to maintain the carcass in position for cutting and to stabilize said keel bone against movement out of alignment with said cutting means to ensure accurate cutting along the keel bone.

2. The method of claim 1, further comprising the step of engaging the thigh joints with a joint separating means prior to passing said keel bone through said cutting means.

3. The method of claim 1, further comprising the step of concurrently cutting both the vertebrae and said keel bone of said carcass with said cutting means.

4. The method of claim 1, further comprising the step of moving the carcass along an internal guide rail with the thighs of the carcass straddling the guide rail.

5. The method of claim 1, further comprising the step of engaging said carcass with said cutting means so that said carcass is divided into two pieces.

6. The method of claim 5, and wherein the steps of engaging the breast of the carcass and guiding said keel bone comprises the steps of:

as said carcass is moved toward said cutting means, guiding said portion of said keel bone with a guide arm means; and after guiding said portion with said guide arm means and during cutting by said cutting means, guiding said portion with a roller means.

7. The method of claim 6, wherein said guide arm means comprises a pivotal arm urged against said keel bone, said pivotal arm having at least two faces configured to guide said keel bone.

8. The method of claim 6, wherein said cutting means comprises a rotary halving blade and wherein said roller means comprises a pair of rollers, each of said rollers on opposing sides of said rotary halving blade.

9. A method for bisecting a poultry breast along its keel bone of a previously eviscerated poultry carcass with a rotary disc cutter, comprising the steps of:

moving the visceral cavity of the carcass about and along an internal guide rail and toward said disc cutter;

as the carcass moves along said internal guide rail, engaging the breast of the carcass on opposite sides of the keel bone with a guide means so that the keel bone of the carcass becomes longitudinally aligned with the disc cutter;

urging said keel bone toward the internal guide rail as the carcass is moved toward the disc cutter to maintain said keel bone in longitudinal alignment with the disc cutter; and while said keel bone is longitudinally aligned with the disc cutter, cutting with said disc cutter longitudinally through the breast and keel bone to bisect the breast.

10. The method of claim 9, further comprising the step of engaging the thigh joints with a joint separating means prior to passing said keel bone through said cutting means.

11. The method of claim 9, further comprising the step of concurrently cutting the vertebrae and said keel bone with said cutting means.

12. The method of claim 9, further comprising the step of moving said carcass suspended by its legs with a conveyor.

13. The method of claim 9, further comprising the step of tilting said carcass to a position where said keel bone is substantially parallel to said internal guide rail.

14. The method of claim 9 and wherein the step of engaging the keel bone comprises:

as said carcass is removed toward said cutting means, guiding a portion of said keel bone with a guide arm means having at least two faces configured to contact said keel bone.

15. An apparatus for bisecting the breast of a previously eviscerated poultry carcass along its keel bone as said carcass is transported via a conveyor along a processing path toward a cutting means, comprising:

a pivotal guide arm with a lever end and a distal end, means for urging said distal end toward engagement with said carcass as the carcass is transported along the processing path, said guide arm having faces adjacent said distal end, said faces configured to engage and center said carcass so that the center of said keel bone is in approximate alignment with said cutting means; and rollers situated at said distal end, means for urging said rollers toward said carcass and for engaging said keel bone in a straddling relationship with respect to the keel bone to maintain the keel bone in an approximately centered orientation aligned with said cutting means as the carcass is cut by said cutting means to ensure separation of the carcass into substantially equal sections.

16. The apparatus of claim 15, wherein said cutting means comprises a rotary halving blade positioned substantially in the center of said internal guide rail.

17. The apparatus of claim 16, wherein a roller is situated on opposing sides of said rotary halving blade, said rollers being urged toward said carcass via a spring means.

18. An apparatus for centrally aligning and cutting a keel bone of a previously eviscerated poultry carcass as the carcass is suspended by its legs via a conveyor and is carried along a processing path toward a cutting means, comprising:

an elongated internal guide rail substantially aligned with said processing path for receiving and supporting the visceral cavity of said carcass;

a guide arm means adapted to receive and guide the breast of the carcass toward said internal guide rail so that the center of said keel bone moves in approximate alignment with said cutting means; and a roller means for engaging the carcass in straddling relationship about said keel bone and urging said keel bone against said internal guide rail to maintain the keel bone in an approximately centered alignment with said cutting means as the keel bone is cut by said cutting means to ensure an accurate separation of the breast of the carcass into substantially equal sections.

19. The apparatus of claim 18, wherein said cutting means comprises a rotary halving blade positioned substantially in the center of said internal guide rail.

20. The apparatus of claim 18, wherein said guide arm means comprises an arm having at least two faces configured to guide said keel bone, said faces being urged toward said carcass via a spring means.

21. The apparatus of claim 20, wherein said roller means comprises a pair of rollers situated at a distal end of said arm, each of said rollers situated on opposing sides of said cutting means, said rollers being urged toward said carcass via said spring means.

* * * * *